June 4, 1940.  R. N. STIBBINS  2,203,604
KITE STRING HOLDER
Filed July 18, 1939
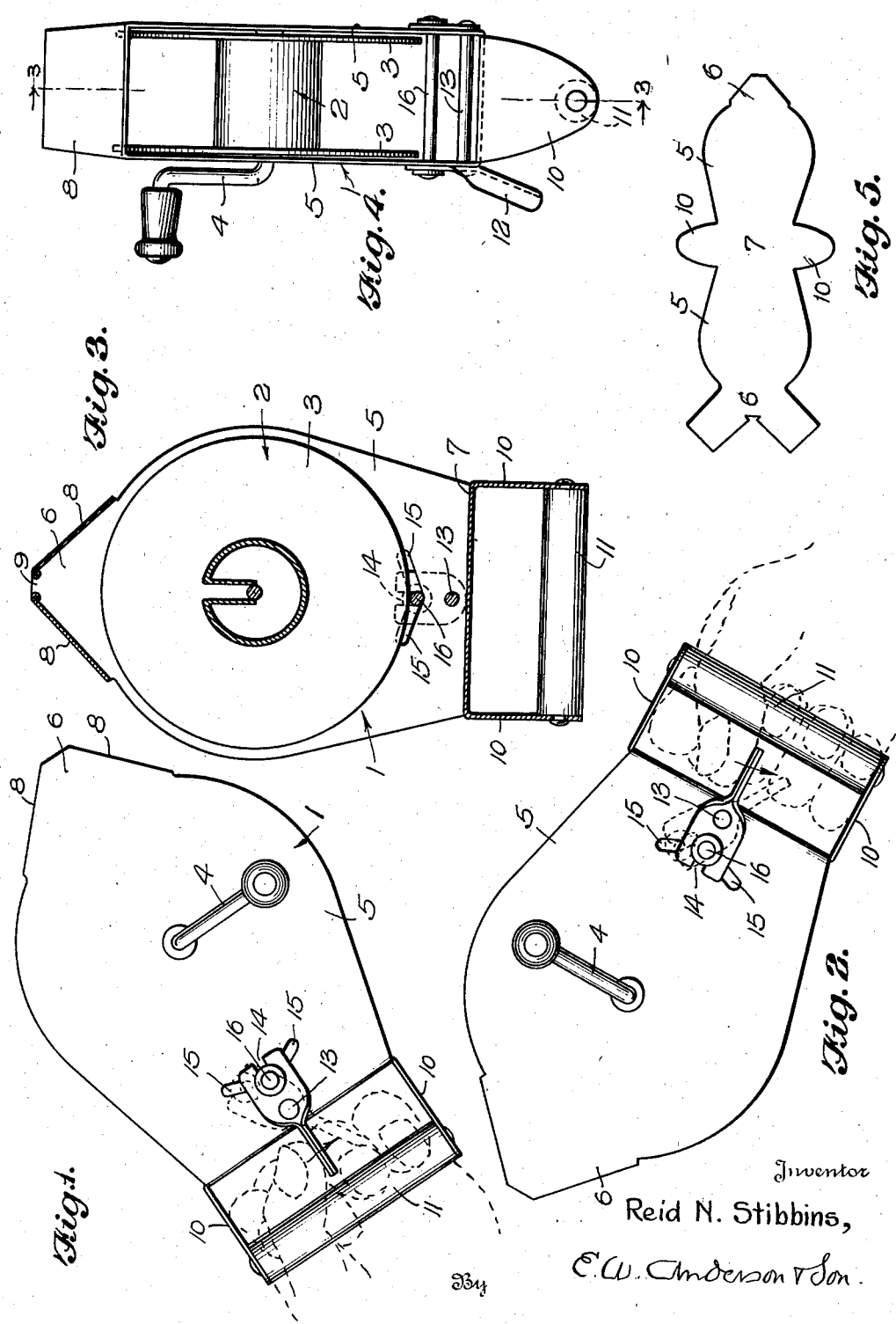
Inventor
Reid N. Stibbins,
By E. W. Anderson & Son.
Attorney Patented June 4, 1940

2,203,604

UNITED STATES PATENT OFFICE 2,203,604

KITE STRING HOLDER

Reid N. Stibbins, Louisville, Ky.

Application July 18, 1939, Serial No. 285,199

3 Claims. (Cl. 242—99)

The invention relates to kite string holders, and has for an object to provide an improved device of this description having a brake control for the reel adapted to be operated by either hand as in the case of a right-hand or left-hand person. Another object is to provide a simple device capable of economical manufacture and sale at small cost. Other objects and advantages will appear hereinafter.

The invention consists in the novel construction and combinations of parts as hereinafter set forth in the claims.

In the accompanying drawing,

Figure 1 is a side view of the device, showing the brake control as in use by one hand, said hand being shown in dotted lines.

Figure 2 is a similar view showing the brake controls as in use by the other hand, said hand being also shown in dotted lines.

Figure 3 is a central vertical section on the line 3—3, Figure 4.

Figure 4 is an end view of the device.

Figure 5 is a plan view of a blank for the carrying frame.

In the drawing, the numeral 1 designates the carrying frame, having mounted therein a rotatable reel 2 provided with end flanges 3 and a crank handle 4.

This carrying frame is provided with opposite spaced sides 5, entirely enclosing and protecting said reel at the sides and having an upper extension 6 connecting said sides and a bottom 7 also connecting said sides. The upper extension 6 has inclined ends 8, constituting that portion of the extension which connects the frame sides, said ends extending towards each other upwardly and being spaced apart at their upper ends at 9 provide a horizontal slot for the kite string. The bottom of said frame has depending end lugs 10, upon which is mounted a horizontal handle 11 spaced from the frame bottom to admit the fingers of one hand in grasping said handle. This carrying frame is adapted to be made of one piece of sheet metal as shown in Figure 5 and the sides of the frame being connected at top and bottom, the frame is strong and well braced.

The brake control for the reel comprises a lever 12, having duplicate spaced upper arms and a fulcrum rod 13 connecting said arms and having bearings in said frame, said upper arms having each a slot 14, said frame having oppositely inclined converging cam slots 15, a normally inoperative brake rod 16 loosely engaging the lower ends of said slots 14 and 15. The lever 12 is normally vertical and is provided with a handle arm located centrally of and adjacent said frame handle and movable to one side or the other for braking purposes whereby one or the other of said cam slots will engage the brake rod and force the same upwardly in slots 14 of the upper arms of the lever into braking engagement with the circumferential edges of the end flanges of the reel. The handle arm of the brake lever is thus within easy reach of the thumb of that hand the fingers of which are grasping the horizontal frame handle and as said handle arm may be moved to either side in accomplishing the braking of the reel, the device is adapted for use by either hand as in the case of a right-hand or a left-hand boy, as shown in Figures 1 and 2 of the drawing.

The form of the invention herein shown and described is preferred, but it is to be understood that changes may be made with respect to material, shape, size and arrangement of parts, without departing from the spirit of the invention.

I claim:

1. In a kite string holder, provided with a carrying frame and a rotatable reel having bearings in said frame and a crank handle; a brake device comprising a manipulative lever having fulcrum bearings in said frame, one arm of said lever having a slot and said frame having oppositely inclined converging cam slots, and a normally inoperative brake member engaging the lower ends of said cam slots and said lever slot, said cam slots being adapted respectively upon manipulation of said lever to either side to cam said brake member into engagement with said reel.

2. In a kite string holder provided with a carrying frame and a rotatable reel having bearings in said frame and a crank handle; a brake device comprising a manipulative lever having duplicate spaced upper arms and a fulcrum rod having bearings in said frame and connecting said arms, said upper arms having each a slot, said frame having oppositely inclined converging cam solts, and a brake rod engaging the slots of said arms and said cam slots, said cam slots being adapted respectively upon movement of said lever to either side to cam said brake rod into engagement with said reel.

3. In a kite string holder provided with a carrying frame and a rotatable reel having bearings in said frame and a crank handle; said frame comprising opposite spaced sides entirely inclosing and protecting said reel at the sides and provided with an upper extension connecting said sides and provided with a top opening for the string, said frame having a bottom connecting said sides and provided with depending end lugs and a horizontal handle mounted upon said lugs and spaced from the frame bottom, and a brake device comprising a lever fulcrumed to said frame and a member mounted upon said lever and adapted to engage said reel, said lever being normally vertical and having a handle arm located centrally of and adjacent said frame handle and movable to one side or the other for braking purposes.

REID N. STIBBINS.